(12) United States Patent
Narendra et al.

(10) Patent No.: US 7,805,615 B2
(45) Date of Patent: Sep. 28, 2010

(54) ASYMMETRIC CRYPTOGRAPHY WITH USER AUTHENTICATION

(75) Inventors: Siva G. Narendra, Portland, OR (US); Prabhakar Tadepalli, Bangalore (IN); Thomas N. Spitzer, Portland, OR (US)

(73) Assignee: Tyfone, Inc., Portland, OR (US)

( * ) Notice: Subject to any disclaimer, the term of this patent is extended or adjusted under 35 U.S.C. 154(b) by 1380 days.

(21) Appl. No.: 11/182,520

(22) Filed: Jul. 15, 2005

(65) Prior Publication Data

US 2007/0016798 A1   Jan. 18, 2007

(51) Int. Cl.
*G06F 21/00* (2006.01)

(52) U.S. Cl. .................. 713/186; 713/185; 380/44; 380/46

(58) Field of Classification Search .............. 726/9, 726/20, 5, 7, 18, 19; 713/186, 185; 380/44, 380/46
See application file for complete search history.

(56) References Cited

U.S. PATENT DOCUMENTS

| | | | |
|---|---|---|---|
| 5,585,787 A | 12/1996 | Wallerstein | |
| 5,952,641 A | 9/1999 | Korshun | |
| 5,995,630 A | 11/1999 | Borza | |
| 6,035,398 A * | 3/2000 | Bjorn | 713/186 |
| 6,219,439 B1 | 4/2001 | Burger | |
| 6,315,195 B1 | 11/2001 | Ramachandran | |
| 6,330,674 B1 | 12/2001 | Angelo et al. | |
| 6,594,759 B1 | 7/2003 | Wang | |
| 6,598,031 B1 | 7/2003 | Ice | |
| 6,609,654 B1 | 8/2003 | Anderson et al. | |
| 6,636,833 B1 | 10/2003 | Flitcroft et al. | |
| 6,687,375 B1 | 2/2004 | Matyas et al. | |
| 6,705,520 B1 | 3/2004 | Pitroda et al. | |
| 6,769,607 B1 | 8/2004 | Pitroda et al. | |
| 6,805,288 B2 | 10/2004 | Routhenstein et al. | |
| 6,836,843 B2 | 12/2004 | Seroussi et al. | |
| 6,845,453 B2 | 1/2005 | Scheidt et al. | |
| 6,845,908 B2 | 1/2005 | Morita et al. | |
| 6,848,050 B1 | 1/2005 | Merman et al. | |
| 6,857,566 B2 | 2/2005 | Wankmueller | |
| 6,871,278 B1 | 3/2005 | Sciupac | |
| 6,886,096 B2 | 4/2005 | Appenzeller et al. | |

(Continued)

FOREIGN PATENT DOCUMENTS

WO   WO-0036566 A1   6/2000

(Continued)

OTHER PUBLICATIONS

Uludag, U. et al., "Multimedia Content Protection Via Biometrics-based Encryption", *Multimedia and Expo, 2003. Proceedings. 2003 International Conference*, vol. 3, (Jul. 2003),237-240.

(Continued)

*Primary Examiner*—Kimyen Vu
*Assistant Examiner*—Edward Zee
(74) *Attorney, Agent, or Firm*—LeMoine Patent Services, PLLC; Dana B. LeMoine

(57) ABSTRACT

A device uses a user authentication factor to generate a decryption key for use in asymmetric cryptography. An encryption key is generated from the decryption key using a one-way function.

36 Claims, 4 Drawing Sheets

U.S. PATENT DOCUMENTS

| | | | |
|---|---|---|---|
| 6,901,145 | B1 | 5/2005 | Bohannon et al. |
| 6,908,030 | B2 | 6/2005 | Rajasekaran et al. |
| 2001/0007132 | A1 | 7/2001 | Regev |
| 2001/0034718 | A1 | 10/2001 | Shaked et al. |
| 2002/0039063 | A1 | 4/2002 | Ritter |
| 2002/0096570 | A1 | 7/2002 | Wong et al. |
| 2002/0099665 | A1 | 7/2002 | Burger et al. |
| 2002/0180584 | A1 | 12/2002 | McGregor et al. |
| 2002/0186845 | A1 | 12/2002 | Dutta et al. |
| 2003/0028481 | A1 | 2/2003 | Flitcroft et al. |
| 2003/0061168 | A1 | 3/2003 | Routhenstein |
| 2003/0220876 | A1 | 11/2003 | Burger et al. |
| 2004/0044896 | A1 | 3/2004 | Kelley et al. |
| 2004/0050930 | A1 | 3/2004 | Rowe |
| 2004/0133787 | A1 | 7/2004 | Doughty et al. |
| 2005/0006462 | A1 | 1/2005 | Rouille et al. |
| 2005/0029349 | A1 | 2/2005 | McGregor et al. |
| 2005/0038736 | A1 | 2/2005 | Saunders |
| 2005/0044044 | A1 | 2/2005 | Burger |
| 2005/0050367 | A1 | 3/2005 | Burger et al. |
| 2005/0060586 | A1 | 3/2005 | Burger et al. |
| 2005/0077349 | A1 | 4/2005 | Bonalle |
| 2005/0108096 | A1 | 5/2005 | Burger et al. |
| 2005/0109838 | A1 | 5/2005 | Linlor |
| 2005/0116026 | A1 | 6/2005 | Burger et al. |
| 2005/0121512 | A1 | 6/2005 | Wankmueller |
| 2005/0127164 | A1 | 6/2005 | Wankmueller |

FOREIGN PATENT DOCUMENTS

| | | |
|---|---|---|
| WO | WO-03029942 A2 | 4/2003 |
| WO | WO-03081519 A2 | 10/2003 |
| WO | WO-2007011990 A2 | 1/2007 |

OTHER PUBLICATIONS

Menezes, V. O., "Handbook of Applied Cryptography".

"PCT Search Report", *PCT/US2006/027978*, (Jul. 17, 2006), 1-13.

\* cited by examiner

ASYMMETRIC CRYPTOGRAPHY WITH USER AUTHENTICATION

FIELD

The present invention relates generally to secure data storage, and more specifically to the use of asymmetric cryptography for secure data storage.

BACKGROUND

Cryptography may be used to limit access to data. For example, sensitive data in computers or networks may be encrypted to block access by unauthorized users. Cryptography may be utilized to securely store information or to securely share information.

Different types of cryptography are in use today. Examples include symmetric cryptography and asymmetric cryptography. In symmetric cryptography, encryption and decryption are performed with the same "key." Symmetric cryptography is sometimes also referred to as secret key cryptography, because the key cannot be disclosed for the data to remain secure. Triple-DES cryptography is an example of symmetric cryptography.

Asymmetric cryptography uses two keys: an encryption key, and a decryption key, where the encryption key is derived from the decryption key using a one-way function. In asymmetric cryptography, the encryption key (also referred to as the public key) can be disclosed since it can only encrypt and not decrypt data. The decryption key (also referred to as the private key) cannot be disclosed for the data to remain secure. Examples of asymmetric cryptography include Rivest-Shamir-Adleman (RSA) and elliptic curve cryptography.

DESCRIPTION OF EMBODIMENTS

Figure 1:
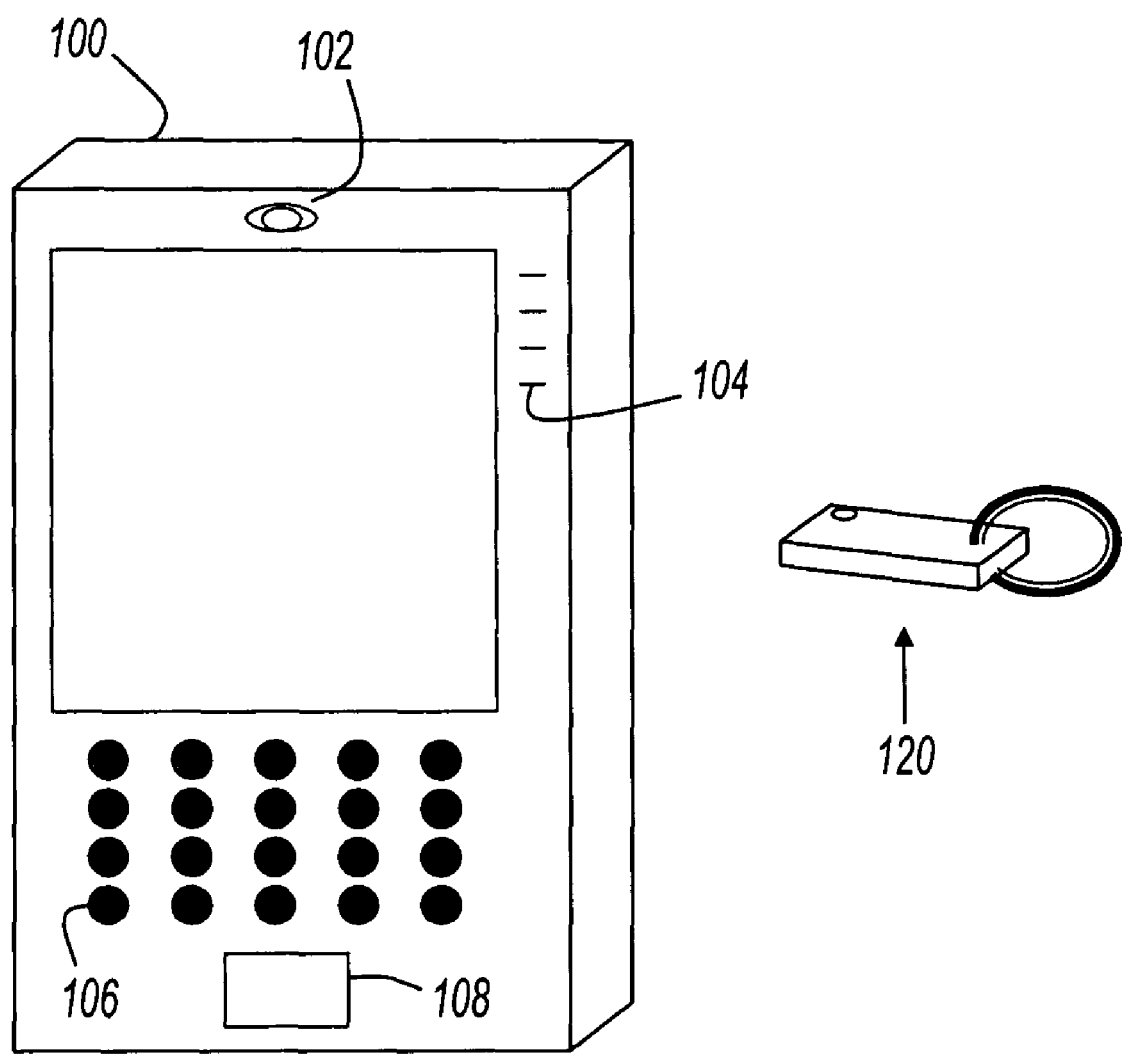
FIG. 1 shows a mobile electronic device in accordance with various embodiments of the present invention.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a mobile electronic device. Mobile electronic device 100 may be any type of electronic device considered to be mobile. For example, mobile electronic device 100 may be a personal digital assistant (PDA), a smartphone, a mobile phone, a handheld computer, or any other device capable of operating as described herein. FIG. 1 also shows secondary electronic device 120. Secondary electronic device 120 is shown as a key fob separate from mobile electronic device 100 in FIG. 1, but this is not a limitation of the present invention. For example, secondary electronic device 120 may be a card that attaches to, and detaches from, mobile electronic device 100. Accordingly, secondary electronic device 120 may be separate from, or separable from, mobile electronic device 100.

Mobile electronic device 100 is shown including controls 106, fingerprint scanner 108, voice input 104, and retinal scanner 102. Fingerprint scanner 108, voice input 104, and retinal scanner 102 are examples of biometric information collection devices capable of collecting biometric information to authenticate a user of mobile device 100. Controls 106 represent an input device capable of accepting other types of user authentication information, such as a password or personal identification number (PIN).

Biometric information, passwords, and PINs are examples of user authentication factors (UAF) useful to authenticate a user to mobile electronic device 100. For example, access to mobile device 100 or features of mobile electronic device 100 may be limited to users that satisfy certain requirements with respect to matching UAFs.

Other types of information may also be used as user authentication factors. For example, UAFs may include unique identifiers (IDs) related to hardware devices such as mobile electronic device 100 or secondary electronic device 120. In some embodiments of the present invention, user authentication is performed using a combination of UAFs. For example, a unique ID may be combined with biometric information to authenticate a user to mobile electronic device 100. Unique IDs may be received by mobile electronic device 100 in many ways. For example, a unique ID may be provided by secondary electronic device 120 using a wireless interface, or by physical contact between mobile electronic device 100 and secondary electronic device 120. Also for example, a unique ID may be provided by an internal subsystem within mobile electronic device 100, such as a hard disk drive, a memory subsystem, or a processor.

Mobile electronic device 100 may provide secure data storage or secure data transfer using asymmetric cryptography that utilizes UAFs. For example, a decryption key may be generated from a mathematical representation of one or more UAFs, and an encryption key may then be derived from the decryption key using a one-way function. Asymmetric cryptography embodiments are described in further detail below with reference to later figures.

Mobile electronic device 100 may include a mechanism to allow mobile electronic device 100 to communicate with a wired or wireless network. For example, mobile electronic device 100 may include circuitry to communicate with a cellular phone network. Note that in these embodiments, mobile electronic device 100 may or may not be a phone. For example, mobile electronic device 100 may be a cellular telephone having asymmetric cryptography capabilities. Also for example, mobile electronic device 100 may be a non-telephonic device that has cellular network connectivity. Examples include personal digital assistants, and handheld devices dedicated to secure data storage or secure data exchange. Further, mobile electronic device 100 may be a non-telephonic device having wired or wireless connectivity to a network other than a cellular network, and in some embodiments, mobile electronic device 100 may be a device without network connectivity. Examples include, but are not limited to: music players such as MP3 players, cameras, and the like.

In some embodiments, mobile electronic device 100 is an example of a "wearable" device that is capable of securely storing or exchanging data. For example, in some embodiments, mobile electronic device 100 may have the form factor of a wristwatch. Some embodiments of the present invention may have other wearable form factors. For example, a wearable mobile electronic device may be worn in such a manner that it contacts human skin, or it may be worn on clothing. Any wearable intelligent electronic device may be employed without departing from the scope of the present invention.

Figure 2:
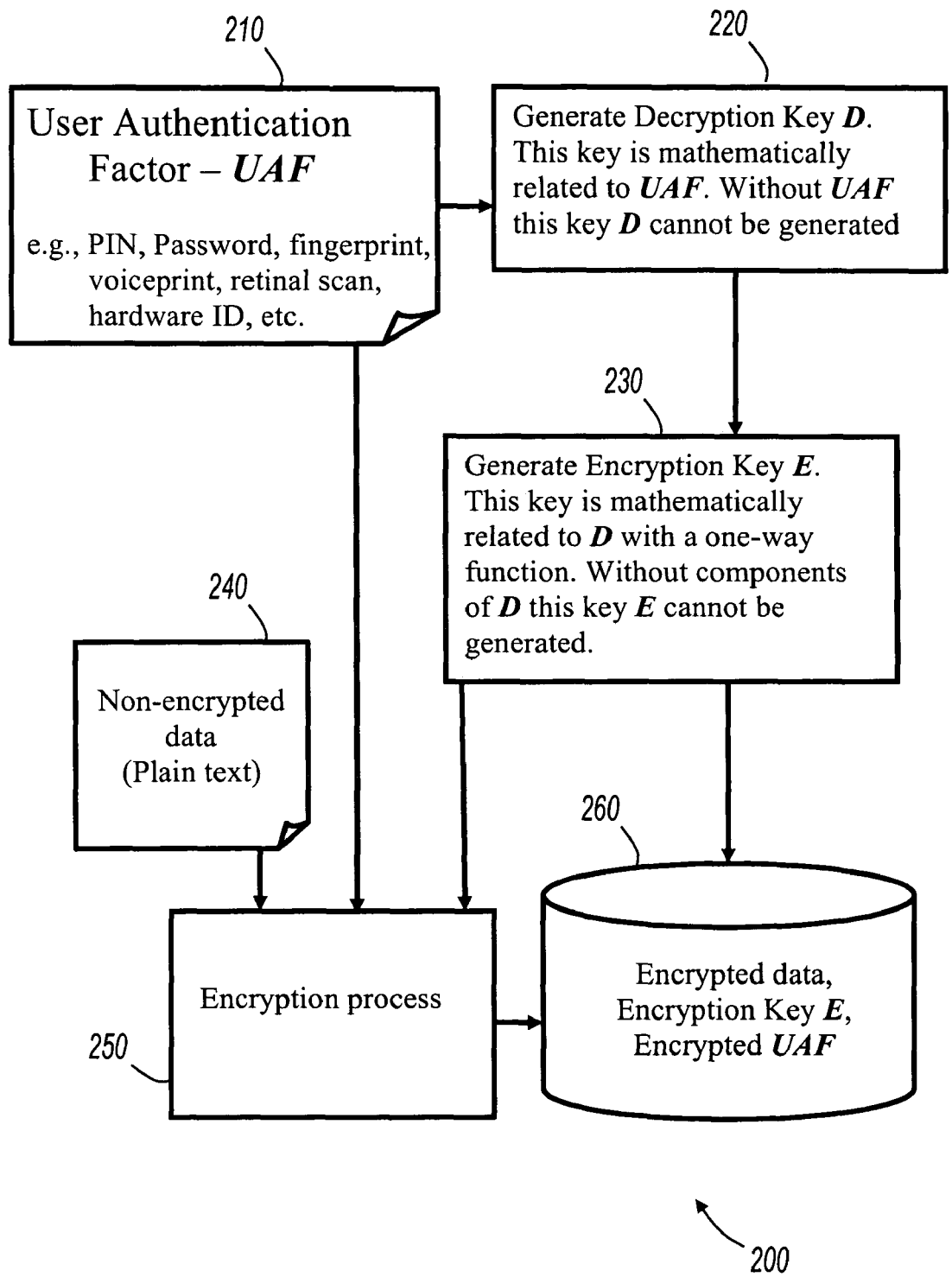
FIGS. 2 and 3 show flow diagrams in accordance with various embodiments of the present invention.

FIG. 2 shows a flow diagram in accordance with various embodiments of the present invention. Diagram 200 represents data flow and actions that may be performed when encrypting data in accordance with various embodiments of the present invention. The various actions represented in FIG. 2 may be performed by a mobile electronic device such as mobile electronic device 100 (FIG. 1), although this is not a limitation of the present invention. For example, the various actions in FIG. 2 may be performed by a non-mobile computing device such as a desktop computer, workstation, or mainframe computer.

Block 210 represents the collection of one or more user authentication factors (UAFs). As shown in block 210, a UAF may be biometric information, a password or PIN, a hardware ID, or any combination. For example, a user may provide a fingerprint and also present a secondary electronic device that transmits a unique hardware ID. The fingerprint and the hardware ID may together be considered a UAF. The collection of UAF may be performed with biometric sensors such as those shown on mobile electronic device 100 (FIG. 1). Further, the collection of UAF may be performed over a wired or wireless interface.

At 220, a decryption key D is generated from the UAF. Any functional relationship may be used to relate D to the UAF. For example, if the generation of D uses one or more prime numbers, prime number generation or selection may be a function of the UAF. Further, in some embodiments, D may be set equal to a numerical representation of the UAF. Without the UAF, the decryption key D cannot be generated.

At 230, an encryption key E is generated from the decryption key D using a one-way function. Without components of D, E cannot be generated. Any type of one-way function may be utilized without departing from the scope of the present invention. For example, a one-way function built on the Rivest-Shamir-Adleman (RSA) public key encryption algorithm may be utilized.

The encryption process at 250 encrypts data 240 and the UAF using encryption key E. The encrypted data, encrypted UAF, and encryption key E are stored 260. The decryption key D is not stored.

Figure 3:
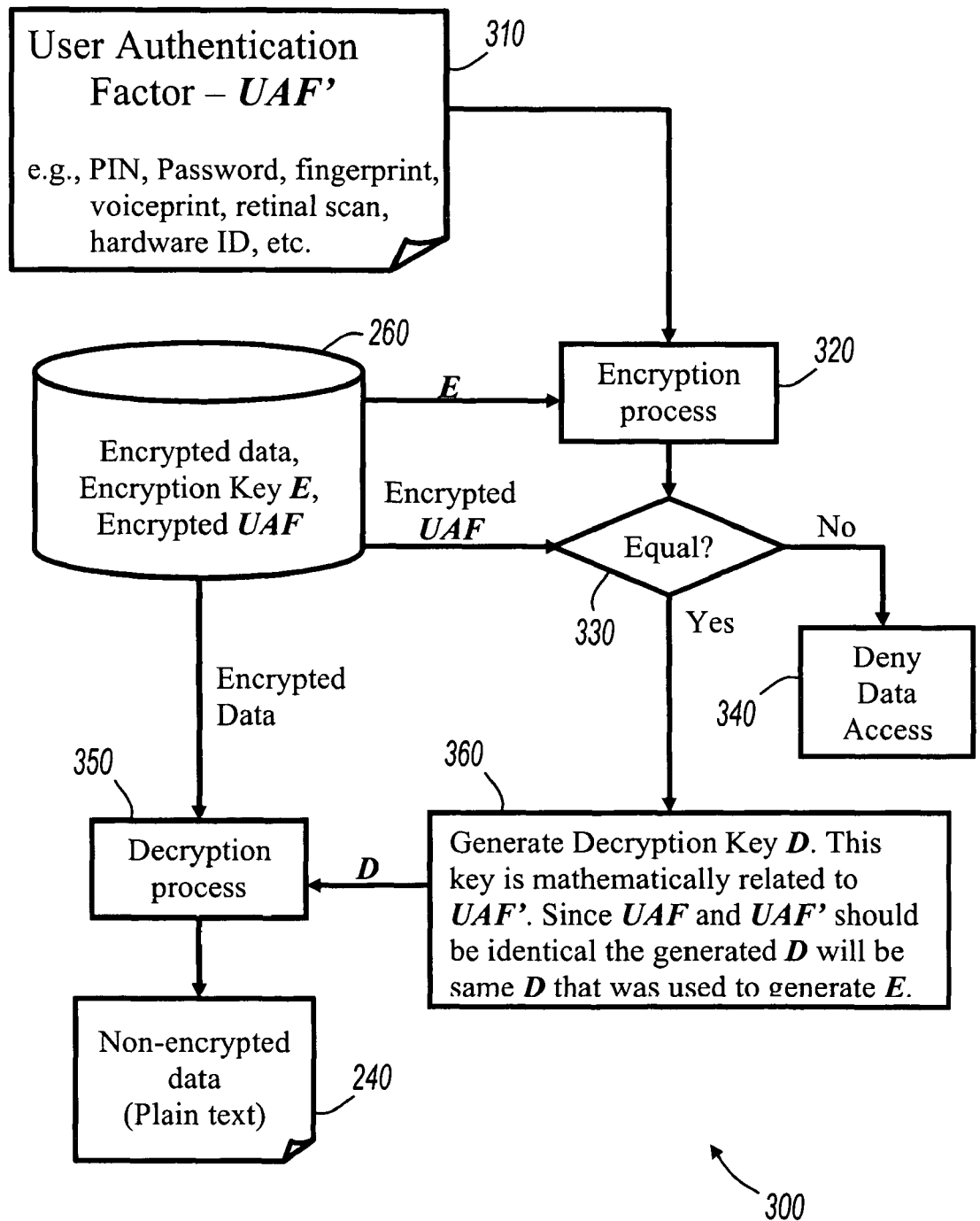

FIG. 3 shows a flow diagram in accordance with various embodiments of the present invention. Diagram 300 represents data flow and actions that may be performed when decrypting data in accordance with various embodiments of the present invention. The various actions represented in FIG. 3 may be performed by a mobile electronic device such as mobile electronic device 100 (FIG. 1), although this is not a limitation of the present invention. For example, the various actions in FIG. 3 may be performed by a non-mobile computing device such as a desktop computer, workstation, or mainframe computer.

Block 310 represents the collection of one or more user authentication factors (UAFs). The UAF in block 310 is collected for the decryption of data and is referred to as UAF' to distinguish it from the UAF collected when the data is encrypted (FIG. 2). As shown in block 310, a UAF' may be biometric information, a password or PIN, a hardware ID, or any combination. For example, a user may provide a fingerprint and also present a secondary electronic device that transmits a unique hardware ID. The fingerprint and the hardware ID may together be considered a UAF'. The collection of UAF' may be performed with biometric sensors such as those shown on mobile electronic device 100 (FIG. 1). Further, the collection of UAF' may be performed over a wired or wireless interface.

The encrypted data, encryption key E, and encrypted UAF are shown stored at 260 as a product of the various actions shown in FIG. 2. At 320, the collected UAF' is encrypted using E, and the result is compared with the encrypted UAF stored at 260. If there is no match, then data access is denied at 340. If there is a match (signifying that UAF and UAF' are equal), then the decryption key D is generated from UAF' at 360. The decryption key D is used to decrypt the data at 350, and the result is the non-encrypted data 240.

Using asymmetric encryption embodiments represented by FIG. 2, once the encryption process is completed, the data stored does not include the decryption key D. Using asymmetric decryption embodiments represented by FIG. 3, the stored data cannot be decrypted unless and until the UAF' is authenticated to be correct. The UAF verification process only utilizes the encryption key E, and therefore does not require the decryption key D.

As described above, the user authentication factor (UAF) can include one or more of biometric factors identifying an individual, passwords or PINs identifying a privileged person or class of persons, or hardware device specific IDs that identify the presence or proximity of a particular piece of equipment. In some embodiments, the UAF used to generate the decryption key D is formed by combining biometric information with one or more hardware IDs. In these embodiments, a valid user may only access encrypted data when a particular piece of hardware is present. For example, a hardware ID from secondary device 120 (FIG. 1) may be combined with a user's fingerprint to form a UAF used to generate D. Also for example, a hardware ID from within mobile electronic device 100 (FIG. 1) may be combined with a biometric factor collected by one or more of the various biometric collection components shown in FIG. 1.

Figure 4:
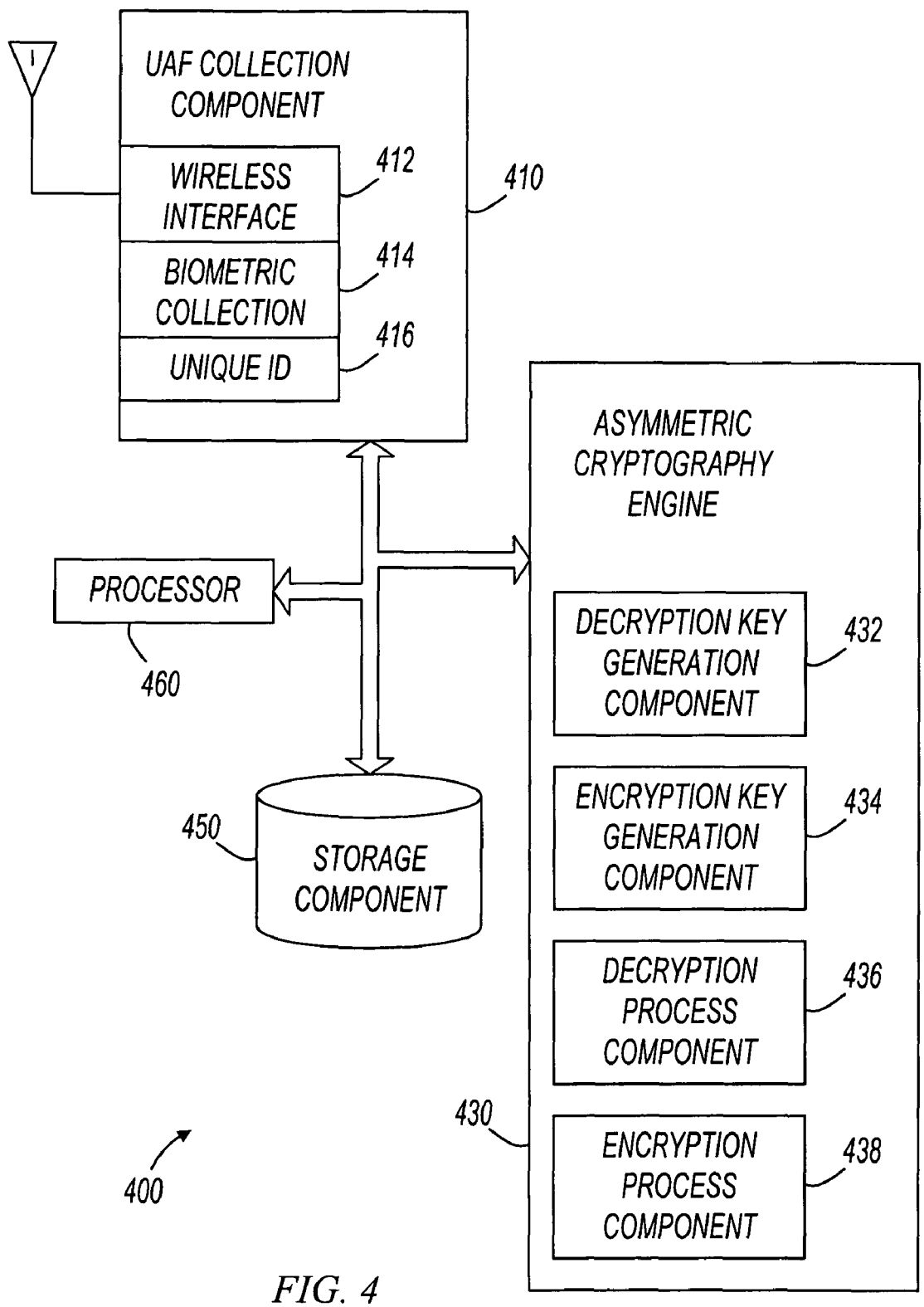
FIG. 4 shows a computer system in accordance with various embodiments of the present invention.

FIG. 4 shows a computer system in accordance with various embodiments of the present invention. Computer system 400 may be a mobile electronic device such as mobile electronic device 100 (FIG. 1), or may be a non-mobile device such as a desktop computer, workstation, server, or mainframe. Computer system 400 includes processor 460, user authentication factor (UAF) collection component 410, asymmetric cryptography engine 430, and storage component 450.

UAF collection component 410 includes one or more components capable of collecting user authentication factors. For example, UAF collection component 410 may include wireless interface 412 to communicate with other electronic devices to receive user authentication factors. Any type of UAF information may be received over wireless interface 412. For example, wireless interface 412 may communicate with a secondary wireless device such as a mobile phone or key fob having a unique ID that is used as a UAF. Also for example, wireless interface 412 may communicate with other computer systems that provide one or more UAFs.

Biometric collection component 414 may include one or more interfaces to collect biometric information of a user. For example, biometric collection component 414 may include a fingerprint scanner, a retinal scanner, a voice recorder, or the like. Unique ID 416 may be collected by UAF collection component 410 in many different ways. For example, one or more subsystems within computer system 400 may provide a unique hardware ID for use as a UAF. Further, unique ID 416 may be provided by a hardware device that is separate from, or separable from, computer system 400.

UAF collection component 410 may be implemented in hardware, software, or any combination. For example, wireless interface 412 may include a network interface card (NIC) that includes a processing device and firmware. Further, biometric collection component 414 may include hardware to provide a physical interface to a person, and may also include a device driver to be executed by processor 460. User authentication factors collected by UAF collection component 410 may be utilized to generate decryption keys in an asymmetric cryptography engine. For example, UAF collection component may provide the UAF referenced in FIG. 2 and the UAF' referenced in FIG. 3.

Asymmetric cryptography engine 430 includes decryption key generation component 432, encryption key generation component 434, decryption process component 436, and encryption process component 438. The various components of asymmetric cryptography engine 430 may be implemented in hardware, software or any combination. For example, the various components may be implemented in software that is executed by processor 460. In these embodiments, the various components of asymmetric cryptography engine 430 may be embodied as instructions on a machine readable medium such as a memory device, hard disk drive, or other storage medium.

In some embodiments, decryption key generation component 432 generates a decryption key D from a user authentication factor. For example, decryption key generation component 432 may perform actions shown at 220 in FIG. 2 or at 360 in FIG. 3. In some embodiments, encryption key generation component 434 generates an encryption key E from a decryption key D using a one-way function. For example, encryption key generation component 434 may perform actions shown at 230 in FIG. 2.

In some embodiments, decryption process component 436 utilizes a decryption key D to decrypt encrypted data. For example, decryption process component 436 may perform actions shown at 350 in FIG. 3. Also in some embodiments, encryption process component 438 utilizes an encryption key E to encrypt data. For example, encryption process component 438 may perform actions shown at 250 in FIG. 2.

Storage component 450 may be any type of storage component capable of storing encrypted data, encrypted UAFs, and encryption keys. For example, storage component 450 may be a memory such as a static random access memory (SRAM), dynamic random access memory (DRAM), or FLASH memory. Also for example, storage component 450 may be a hard disk, floppy disk, CDROM storage, or any other type of storage. Storage component 450 may also include a machine readable medium that includes instructions that when accessed result in processor 460 performing actions. For example, storage component 450 may have instructions to implement the various components of asymmetric cryptography engine 430.

Processor 460 represents a processor capable of communicating with the other blocks shown in computer system 400. For example, processor 460 may be a microprocessor, a digital signal processor (DSP), a microcontroller, or the like. Further, processor 460 may be formed from state machines or other sequential logic. In operation, processor 460 may read instructions and/or data from storage component 450, asymmetric cryptography engine 430, or UAF collection component 410. For example, processor 460 may execute program instructions that implement asymmetric cryptography engine 430.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method for encrypting data comprising:
   receiving at least one user authentication factor;
   generating a decryption key from the at least one user authentication factor;
   generating an encryption key from a one-way function of the decryption key;
   encrypting data using the encryption key;
   encrypting the at least one user authentication factor using the encryption key to produce an encrypted at least one user authentication factor;
   storing the encrypted data;
   storing the encryption key to be used in a later authentication process; and
   storing the encrypted at least one user authentication factor to be used in the later authentication process.

2. The method of claim 1 wherein the at least one user authentication factor includes a unique ID for a hardware device.

3. The method of claim 2 wherein the hardware device comprises a hardware device physically separate from an apparatus performing the method.

4. The method of claim 2 wherein the hardware device comprises a hardware device physically separable from an apparatus performing the method.

5. The method of claim 1 wherein the at least one user authentication factor includes a biometric factor.

6. The method of claim 1 wherein the at least one user authentication factor includes a unique ID for a hardware device and a biometric factor.

7. The method of claim 1 wherein generating a decryption key comprises setting the decryption key equal to the at least one user authentication factor.

8. A method for decrypting data comprising:
   receiving at least one user authentication factor;
   generating a decryption key from the at least one user authentication factor;
   decrypting stored data using the decryption key; and
   encrypting the at least one user authentication factor using a stored encryption key to produce a result, and comparing the result with a stored encrypted user authentication factor, wherein the stored encryption key was previously generated from a one-way function of a decryption key that was generated from a previously received at least one user authentication factor.

9. The method of claim 8 wherein the at least one user authentication factor includes a unique ID for a hardware device.

10. The method of claim 9 wherein the hardware device comprises a hardware device physically separate from an apparatus performing the method.

11. The method of claim 9 wherein the hardware device comprises a hardware device physically separable from an apparatus performing the method.

12. The method of claim 8 wherein the at least one user authentication factor includes a biometric factor.

13. The method of claim 8 wherein the at least one user authentication factor includes a unique ID for a hardware device and a biometric factor.

14. An apparatus with a non-transitory machine readable medium having instructions stored thereon that when accessed result in a machine performing:
    receiving at least one user authentication factor;
    generating a decryption key from the at least one user authentication factor;
    generating an encryption key from a one-way function of the decryption key;
    encrypting data using the encryption key;
    encrypting the at least one user authentication factor using the encryption key to produce an encrypted at least one user authentication factor;
    storing the encrypted data;
    storing the encryption key to be used in a later authentication process; and
    storing the encrypted at least one user authentication factor to be used in the later authentication process.

15. The apparatus of claim 14 wherein the at least one user authentication factor includes a unique ID for a hardware device.

16. The apparatus of claim 15 wherein the hardware device comprises a hardware device physically separate from the machine performing the method.

17. The apparatus of claim 15 wherein the hardware device comprises a hardware device physically separable from the machine performing the method.

18. The apparatus of claim 14 wherein the at least one user authentication factor includes a biometric factor.

19. The apparatus of claim 14 wherein the at least one user authentication factor includes a unique ID for a hardware device and a biometric factor.

20. An apparatus with a non-transitory machine readable medium having instructions stored thereon that when accessed result in a machine performing:
    receiving at least one user authentication factor;
    generating a decryption key from the at least one user authentication factor;
    decrypting stored data using the decryption key; and
    encrypting the at least one user authentication factor using a stored encryption key to produce a result, and comparing the result with a stored encrypted user authentication factor, wherein the stored encryption key was previously generated from a one-way function of a decryption key that was generated from a previously received at least one user authentication factor.

21. The apparatus of claim 20 wherein the at least one user authentication factor includes a unique ID for a hardware device.

22. The apparatus of claim 21 wherein the hardware device comprises a hardware device physically separate from the machine performing the method.

23. The apparatus of claim 21 wherein the hardware device comprises a hardware device physically separable from the machine performing the method.

24. The apparatus of claim 20 wherein the at least one user authentication factor includes a biometric factor.

25. The apparatus of claim 20 wherein the at least one user authentication factor includes a unique ID for a hardware device and a biometric factor.

26. A computer system for storing and accessing encrypted data, comprising:
    a user authentication factor collection component to receive at least one user authentication factor;
    a decryption key generation component to generate a decryption key from the at least one user authentication factor;
    an encryption key generation component to generate an encryption key from the decryption key using a one-way function;
    an encryption process component to encrypt data and the at least one user authentication factor using the encryption key;
    a decryption process component to decrypt encrypted data using the decryption key; and
    a non-transitory machine readable medium to store the encryption key and the encrypted at least one user authentication factor for later authentication.

27. The computer system of claim 26 wherein the user authentication factor collection component is configured to receive a unique ID for a hardware device as a user authentication factor.

28. The computer system of claim 27 wherein the hardware device comprises a hardware device physically separable from the computer system.

29. The computer system of claim 26 wherein the user authentication factor collection component is configured to receive a biometric factor as a user authentication factor.

30. The computer system of claim 26 wherein the user authentication factor collection component is configured to receive a unique ID for a hardware device and a biometric factor as user authentication factors.

31. An apparatus comprising:
    means for collecting at least one user authentication factor;
    means for generating a decryption key from the at least one user authentication factor;
    means for generating an encryption key from the decryption key using a one-way function;
    means for encrypting data and the at least one user authentication factor using the encryption key;
    means for decrypting data using the decryption key; and
    a non-transitory machine readable medium to store the encryption key and the encrypted at least one user authentication factor for later authentication.

32. A handheld device to store encrypted data, comprising:
    a biometric collection device to collect a biometric user authentication factor;
    an asymmetric cryptography engine to generate an asymmetric decryption key from the biometric user authentication factor, and to generate an asymmetric encryption key from the asymmetric decryption key, and to encrypt the biometric user authentication factor using the asymmetric encryption key; and
    a non-transitory machine readable medium to store the asymmetric encryption key and the encrypted biometric user authentication factor for later authentication.

33. The handheld device of claim 32 wherein the biometric collection device comprises a fingerprint collection device.

34. The handheld device of claim 32 wherein the biometric collection device comprises a retinal scanner.

35. The handheld device of claim 32 further comprising a wireless interface to receive a unique ID from a wireless device.

36. The handheld device of claim 35 wherein the asymmetric cryptography engine is configured to generate the asymmetric cryptography key from the unique ID and the biometric user authentication factor.

* * * * *